US 12,525,252 B2

(12) United States Patent
Takaesu (10) Patent No.: US 12,525,252 B2
(45) Date of Patent: Jan. 13, 2026

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masaya Takaesu, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/925,552

(22) Filed: Oct. 24, 2024

(65) Prior Publication Data

US 2025/0391426 A1    Dec. 25, 2025

(30) Foreign Application Priority Data

Jun. 19, 2024    (JP) .................................. 2024-098994

(51) Int. Cl.
| | |
|---|---|
| *G11B 5/54* | (2006.01) |
| *G11B 5/012* | (2006.01) |
| *G11B 5/55* | (2006.01) |
| *G11B 5/60* | (2006.01) |
| *G11B 20/18* | (2006.01) |

(52) U.S. Cl.
CPC ............ *G11B 5/012* (2013.01); *G11B 5/5547* (2013.01); *G11B 5/607* (2013.01); *G11B 5/6076* (2013.01); *G11B 20/1889* (2013.01); *G11B 2220/2516* (2013.01)

(58) Field of Classification Search
CPC .. G11B 5/00; G11B 5/09; G11B 37/36; G11B 5/54; G11B 5/56; G11B 2005/0021; G11B 5/012; G11B 5/607
USPC ........................................................ 360/48, 75
See application file for complete search history.

(56) References Cited

U.S. PATENT DOCUMENTS

| | | | |
|---|---|---|---|
| 7,088,545 B1 | 8/2006 | Singh et al. | |
| 8,260,029 B2 * | 9/2012 | Saito ...................... | G06V 10/60 356/600 |
| 9,368,152 B1 | 6/2016 | Park | |
| 9,443,543 B1 | 9/2016 | Akiya | |
| 2004/0196454 A1 * | 10/2004 | Ishiguro ............. | G01N 21/8806 356/239.1 |
| 2023/0282231 A1 | 9/2023 | Masuyama et al. | |

FOREIGN PATENT DOCUMENTS

| | | |
|---|---|---|
| JP | 2008-243310 A | 10/2008 |
| JP | 2023-129930 A | 9/2023 |

* cited by examiner

*Primary Examiner* — Nabil Z Hindi
(74) *Attorney, Agent, or Firm* — Knobbe, Martens, Olson & Bear, LLP (57) ABSTRACT

According to one embodiment, a magnetic disk device includes a rotatable disk-shaped recording medium including a plurality of concentric recording tracks, a magnetic head including a write element which writes data to the recording tracks, a heating element, and a sensor which detects a surface condition of the recording medium, and a controller including an inspection circuit which detects, based on an sensor output of the sensor, presence or absence of a bump on a surface of the recording medium, a height and a width of the bump, and a memory which records the detected height and width of the bump.

8 Claims, 9 Drawing Sheets

MAGNETIC DISK DEVICE

CROSS-REFERENCE TO RELATED APPLICATIONS

This application is based upon and claims the benefit of priority from Japanese Patent Application No. 2024-098994, filed Jun. 19, 2024, the entire contents of which are incorporated herein by reference.

FIELD

Embodiments described herein relate generally to a magnetic disk device.

BACKGROUND

As a magnetic disk device, for example, a hard disk drive (HDD) comprises a rotatable disk-shaped recording medium having a magnetic recording layer and a magnetic head that records and reproduces data on and from the magnetic recording layer of the recording medium. The magnetic head includes a slider, and a read head and a write head provided on the slider. In the magnetic disk device, it is required that the gap between the magnetic head and the recording medium is reduced in order to improve recording density. The magnetic head records and reproduces data by moving relative to the recording surface of the recording medium with a minute gap of about 1 nm, and therefore the recording surface of the recording medium must be smooth.

However, the recording surface of the recording media has minute scratches that are created during the manufacturing process of the recording media, defects caused by sputter flakes, etc., such as microscopic protrusions (bumps) with a height of 1 to 8 nm. When the magnetic head travels above the recording surface with such a small gap, the magnetic head may collide with the microscopic protrusions. When collisions with microscopic protrusions are repeated, the magnetic head may be damaged, making it difficult to perform recording and reproduction.

On the other hand, in the case where bumps exist in the seek zone of the magnetic head, the amount of fly of the magnetic head is lowered in the following manner. That is, when the amount of fly of the magnetic head is increased once, and then the seek operation is started and the magnetic head has completely passed the bumps, the amount of fly is decreased. Therefore, when a number of bumps exist on the recording media, the waiting time for cooling in the adjustment of the flying amount of the magnetic head increases. As a result, the magnetic data processing is slowed down, thus making a factor of the degradation of read/write performance.

DETAILED DESCRIPTION

Various embodiments will be described hereinafter with reference to the accompanying drawings. In general, according to one embodiment, a magnetic disk device comprises a rotatable disk-shaped recording medium including a plurality of concentric recording tracks, a magnetic head comprising a write element which writes data to the recording tracks, a heating element, and a sensor which detects a surface condition of the recording medium, and a controller comprising an inspection circuit which detects, based on an sensor output of the sensor, presence or absence of a bump on a surface of the recording medium, a height and a width of the bump, and a memory which records the detected height and width of the bump.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

Figure 1:
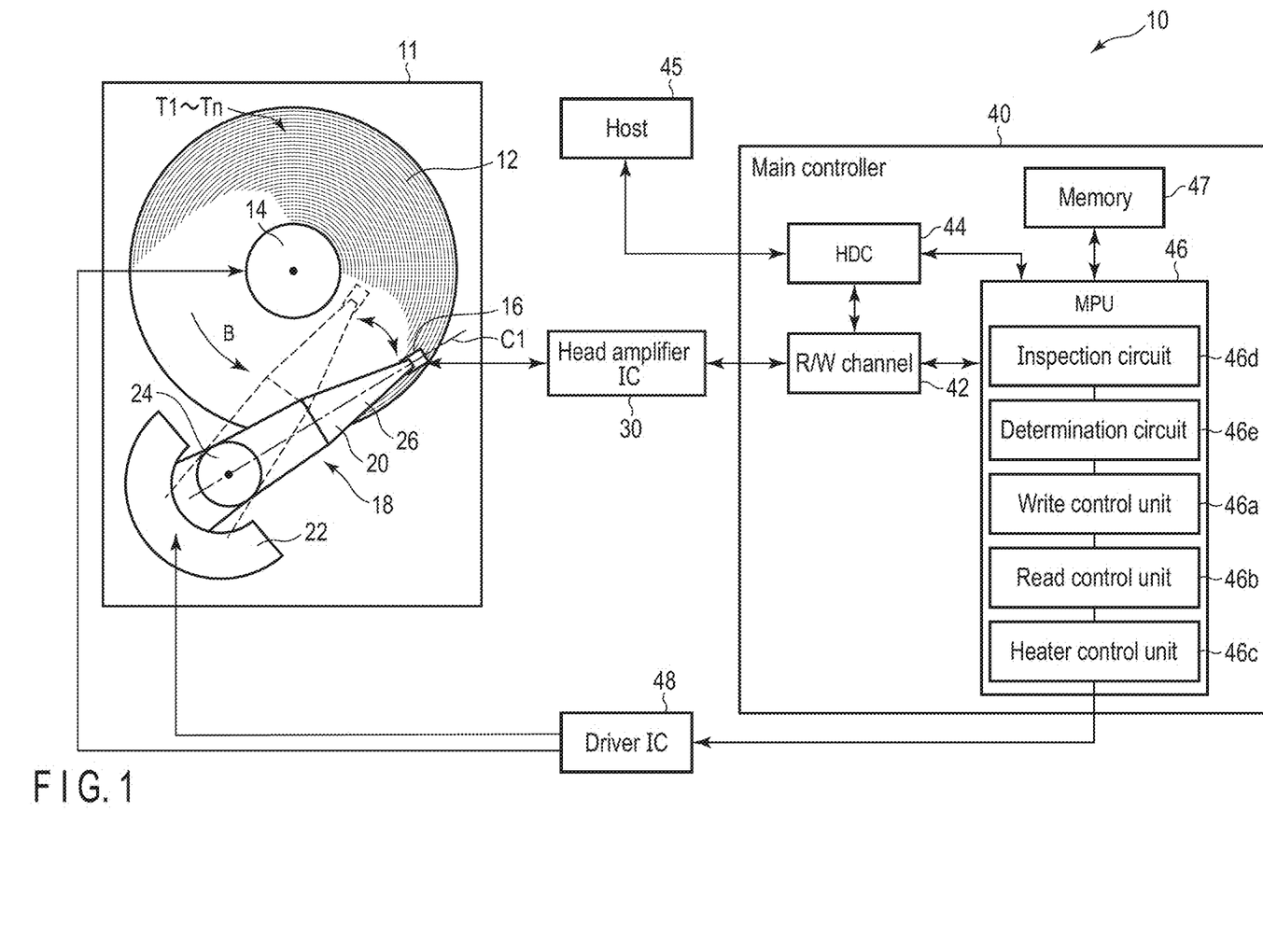
FIG. 1 is a block diagram schematically showing a hard disk drive (HDD) according to the first embodiment.
Figure 2:
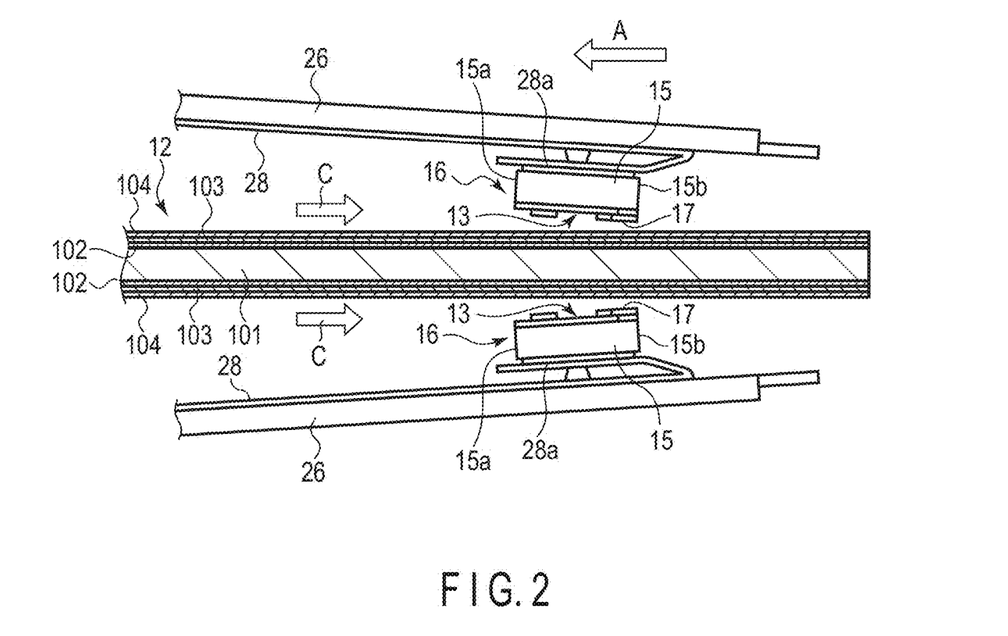
FIG. 2 is a side view schematically showing magnetic heads, suspensions, and a magnetic disk in the HDD.

As one example of the magnetic disk device, a hard disk drive (HDD) according to the first embodiment will be described in detail. FIG. 1 is a block diagram schematically showing the HDD of the first embodiment, and FIG. 2 is a side view showing a magnetic head in a flying state and a magnetic disk.

As shown in FIG. 1, the HDD comprises a rectangular-shaped housing 10, a magnetic disk 12 as a recording medium arranged in the housing 11, a spindle motor 14 that supports and rotates the magnetic disk 12, and a plurality of magnetic heads that perform recording (write) and reproduction (read) of data with respect to the magnetic disk 12. The HDD 10 comprises a head actuator 18 that moves and positions the magnetic heads 16 above any track on the magnetic disk 12. The head actuator 18 includes a carriage assembly 20 that movably supports the magnetic heads 16 and a voice coil motor (VCM) 22 that pivots the carriage assembly 20.

The HDD 10 comprises a controller including a head amplifier IC 30 that drives the magnetic head 16, a main controller 40, and a driver IC 48. The head amplifier IC 30 is provided, for example, in the carriage assembly 20 and is electrically connected to the magnetic head 16. The head amplifier IC 30 includes a recording current supply circuit that supplies a recording current to the recording coil of the magnetic head 16 (recording current supply unit), a heater power supply circuit that supplies drive power to the thermal actuator (heater) of the magnetic head 16, which will be described later, an amplifier that amplifies signals read by the magnetic head 16, and the like.

The main controller 40 and driver IC 48 are configured, for example, on a control circuit board, not shown, provided on region R surface side of the housing 11. The main controller 40 comprises an R/W channel 42, a hard disk controller (HDC) 44, a microprocessor (MPU) 46, a memory 47, and the like. The main controller 40 is electrically connected to the magnetic head 16 via the head amplifier IC 30. The main controller 40 is electrically connected to the VCM 22 and the spindle motor 14 via the driver IC 48. The HDC 44 is connectable to the host computer 45.

In the main controller 40, for example, the MPU 46 includes a write control unit 46a that controls the write head, a read control unit 46b that controls the read head, a heater control unit 46c that controls the power supplied to the thermal actuator, an inspection circuit 46d, a determination circuit 46e and the like. As described below, the inspection circuit 46d inspects the presence/absence and size of microscopic protrusions (bumps) on the surface of the magnetic disk 12 based on the sensor output of the magnetic head 16. Various data are stored in the memory 47, including the inspection results such as the height and width of the bumps, recording inhibited tracks, recording inhibited sectors, heater power setting values, and the like.

As shown in FIGS. 1 and 2, the magnetic disk 12 is configured as a perpendicular magnetic recording medium. The magnetic disk 12 has a substrate 101 made of a non-magnetic material formed into a shape of a round disk, for example, 96 mm (about 3.5 inches) in diameter. A soft magnetic layer 102 made of a material exhibiting soft magnetic properties, a magnetic recording layer 103 having magnetic anisotropy perpendicular to the surface of the magnetic disk 12, and a protective film 104 are sequentially stacked on the upper and lower surfaces of the substrate 101. A plurality of, for example, ten magnetic disks 12 are provided. The plurality of magnetic disks 12 are coaxially mated with each other at the hub of the spindle motor 14. The magnetic disks 12 are rotated by the spindle motor 14 in the direction of arrow B at a predetermined speed.

As shown in FIG. 1, a number of concentric recording tracks T1 to Tn are formed on each of the surfaces (magnetic recording layers) of the magnetic disks 12. Each of the recording tracks T1 to Tn contains a plurality of sectors arranged along the circumferential direction.

The carriage assembly 20 has a bearing portion 24 rotatably supported by the housing 11 and a plurality of arms and suspensions 26 extending from the bearing portion 24. As shown in FIG. 2, the magnetic head 16 is supported on the extending end of each suspension 26. The magnetic head 16 is electrically connected to the head amplifier IC 30 via a wiring member (flexure) 28 provided in the carriage assembly 20.

As shown in FIG. 2, the magnetic head 16 is configured as a flying-type head and includes a slider 15 formed into substantially a rectangular shape and a head portion 17 formed at an end portion of the slider 15 on an outflow end (trailing end) 15b side end thereof. The slider 15 is formed, for example, of a sintered body of alumina and titanium carbide (AlTiC), and the head portion 17 is formed of a plurality of layers of thin films. The slider 15 is attached to a gimbal portion 28a of the wiring member 28.

The slider 15 includes a substantially rectangular disk-facing surface (air bearing surface (ABS) 13) opposing the surface of the magnetic disk 12. The slider 15 is maintained in a state of flying a predetermined amount from the surface of the magnetic disk 12 by the airflow C generated between the disk surface and the ABS 13 by the rotation of the magnetic disk 12. The direction of the air flow C coincides with the rotation direction B of the magnetic disk 12. The slider 15 includes a leading end 15a located on the inflow side of the air flow C and a trailing end 15b located on the outflow side of the air flow C. As the magnetic disk 12 rotates, the magnetic head 16 travels in the direction of arrow A (head traveling direction) with respect to the magnetic disk 12, that is, in the direction opposite to the rotation direction B of the disk.

Figure 3:
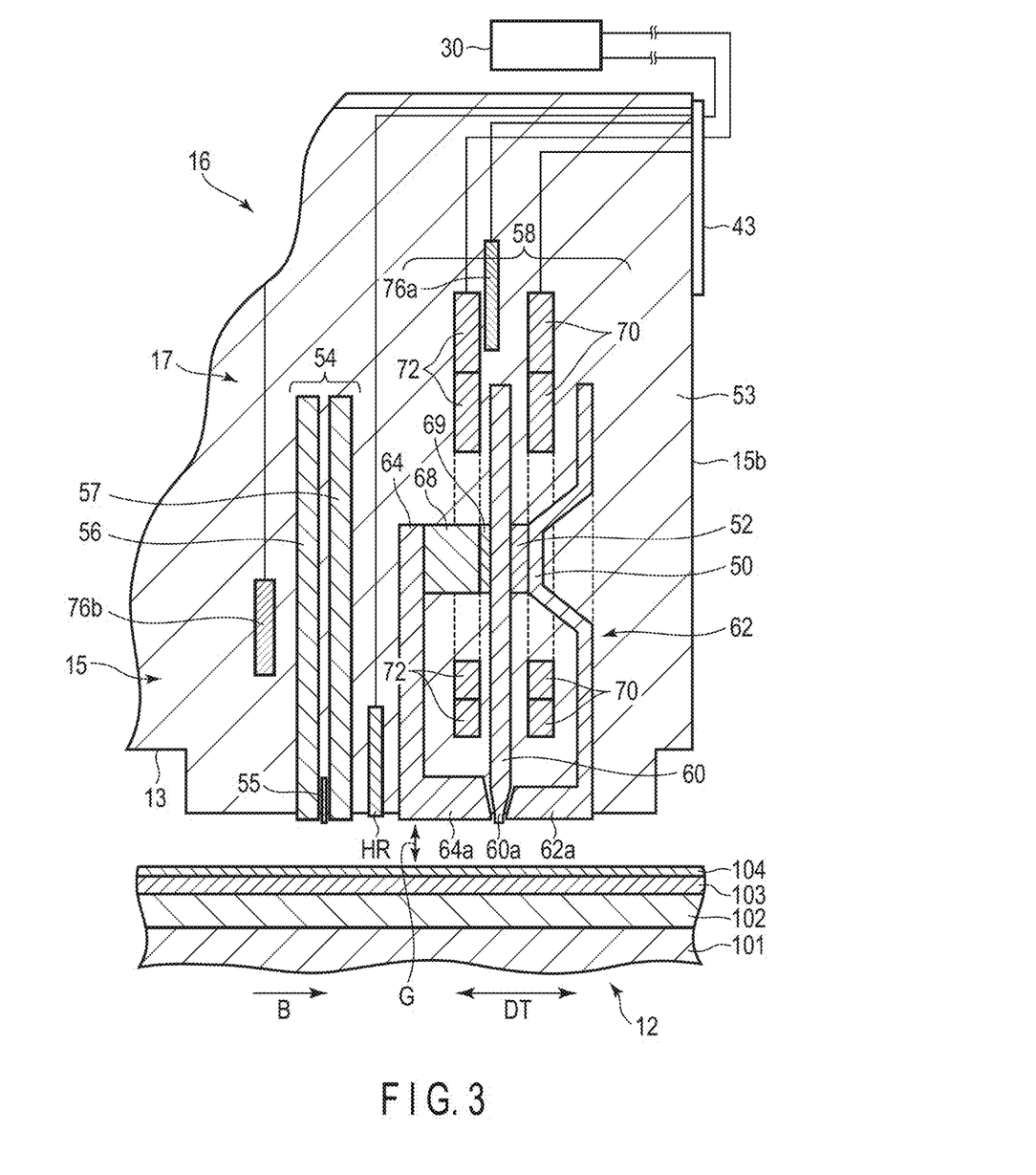
FIG. 3 is an enlarged cross-sectional view showing a head portion of the magnetic head.

FIG. 3 is an enlarged cross-sectional view of the head portion 17 of the magnetic head 16 and the magnetic disk 12.

As shown in FIG. 3, the head portion 17 includes a read head(, which may be referred to as a reproduction element in some cases) 54 and a write head(, which may be referred to as a recording element) 58 formed by a thin film process at the trailing end 15b of the slider 15. The read head 54 and write head 58 are covered by a non-magnetic protective insulating film 53, except for the portion exposed to the ABS 13 of the slider 15. The protective insulating film 53 constitutes the outer shape of the head portion 17. Further, the head portion 17 includes a heat resistance sensor HR that detects the condition (defect state) of the surface of the magnetic disk, a first thermal actuator that controls the amount of protrusion of the write head 58, and a second thermal actuator that controls the amount of protrusion of the read head 54. Note that the surface condition of the magnetic disk is defined as the presence or absence of defects (microprotrusions or recesses) on the surface of the magnetic disk, as well as the degree of height and width of microprotrusions (bumps), as will be described later.

The longitudinal (circumferential) direction of the recording track formed on the magnetic recording layer 103 of the magnetic disk 12 is defined as a track direction DT, and the width direction of the recording track orthogonal to the longitudinal direction is defined as a cross track direction WT.

The read head 54 includes a magnetoresistive element 55, a first magnetic shield film 56, and a second magnetic shield film 57. The first magnetic shield film 56 and the second magnetic shield film 57 are disposed so as to interpose the magnetoresistive element 55 between the leading side (inflow side) and the trailing side (outflow side) of the magnetoresistive element 55 in the track direction DT. The magnetoresistive element 55, the first and second magnetic shielding films 56 and 57 extend approximately perpendicular to the ABS 13. Lower end portions (distal end portions) of the magnetoresistive element 55 and the first and second magnetic shielding films 56 and 57 protrude slightly from the ABS 13.

The write head 58 is provided on the trailing end 15b side of the slider 15 with respect to the read head 54. The write head 58 includes a main magnetic pole 60 that generates a recording magnetic field in a direction perpendicular to the surface of the magnetic disk 12, a trailing shield 62 provided on the trailing side of the main magnetic pole 60 and opposing the main magnetic pole 60 with a write gap therebetween, and a leading shield 64 opposing the leading side of the main magnetic pole 60, and a pair of side shields, not shown, formed to be integrated as one body with the trailing shield 62. The main magnetic pole 60 and the trailing shield 62 constitute a first magnetic core that forms a magnetic path, and the main magnetic pole 60 and the leading shield 64 constitute a second magnetic core that forms a magnetic path. The write head 58 has a first recording coil 70 wound around the first magnetic core and a second recording coil 72 wound around the second magnetic core.

The main magnetic pole 60 is formed of a soft magnetic material having high magnetic permeability and high saturation magnetic flux density and extends approximately perpendicular to the ABS 13. The distal end portion 60a of the main magnetic pole 60 on an ABS 13 side thereof is tapered down toward the ABS 13 to form a columnar shape that is narrower in width than the other portions. The distal end portion 60a of the main magnetic pole 60 protrudes slightly from the ABS 13 of the slider 15.

The trailing shield 62 is formed of a soft magnetic material to efficiently close the magnetic path through the soft magnetic layer 102 of the magnetic disk 12 located directly below the main magnetic pole 60. The trailing shield 62 is formed into an approximately L-shaped configuration, and a distal end portion 62a thereof is formed into a slender rectangular shape. The distal end portion 62a of the trailing shield 62 protrudes slightly from the ABS 13 of the slider 15.

The trailing shield 62 includes a first connection portion 50 connected to the main magnetic pole 60. The first connection portion 50 is magnetically connected to an upper portion of the main magnetic pole 60, that is, a portion of the main magnetic pole 60, which is spaced away from the ABS 13, via a non-conductor 52. The first recording coil 70 is wound around the first connection portion 50, for example, in the first magnetic core. When writing signals to the magnetic disk 12, a recording current is applied to the first recording coil 70, and thus the first recording coil 70 excites the main magnetic pole 60 to cause a magnetic flux to flow to the main magnetic pole 60.

A leading shield 64 made of a soft magnetic material is provided on the leading side of the main magnetic pole 60 so as to oppose the main magnetic pole 60. The leading shield 64 is formed into an approximately L-shape, and the distal end portion 64a on the ABS 13 side is formed into an elongated rectangular shape. The distal end portion 64a protrudes slightly from the ABS 13 of the slider 15.

Further, the leading shield 64 includes a second connection portion 68 joined to the main magnetic pole 60 at a site spaced apart from the ABS 13. The second connection portion 68 is formed, for example, of a soft magnetic material and is magnetically connected to an upper portion of the main magnetic pole 60, that is, a portion of the main magnetic pole 60, which is spaced apart from the ABS 13, via a non-conductor 69. With this configuration, the second connection portion 68 forms a magnetic circuit together with the main magnetic pole 60 and the leading shield 64. The second recording coil 72 of the write head 58 is wound around the second connection portion 68, for example, and applies a magnetic field to this magnetic circuit.

The first thermal actuator includes, for example, a heater 76a as a heating element. The heater 76a is embedded within the protective insulating film 53 and is located near the wright head 58. The second thermal actuator includes, for example, a heater 76b as a heating element. The heater 76b is embedded within the protective insulating film 53 and located near the read head 54.

The heat resistance sensor HR is embedded within the protective insulating film 53 and located between the wright head 58 and the read head 54. The detection end (distal end portion) of the heat resistance sensor HR is exposed to the ABS 13 or slightly protrudes therefrom. The heat resistance sensor HR is used as an example of a head disk interface (HDI) sensor.

As shown in FIG. 3, a plurality of connection terminals 43 are provided at the trailing end 15b of the slider 15. The first recording coil 70 and the second recording coil 72 are respectively connected to the connection terminals 43 via wiring lines and are further connected to the head amplifier IC 30 via the flexure 28. When writing signals to the magnetic disk 12, a recording current is supplied to the first recording coil 70 and the second recording coil 72 from the recording current supply circuit of the head amplifier IC 30 so as to excite the main magnetic pole 60 and cause magnetic flux to flow to the main magnetic pole 60. The recording current supplied to the first recording coil 70 and the second recording coil 72 is controlled by the main controller 40.

The magnetoresistive element 55 of the read head 54 is connected to the connection terminals 43 via wiring lines not shown, and is further connected to the head amplifier IC 30 via the flexure 28. The signal read by the read head 54 is amplified by the head amplifier IC 30 and sent to the main controller 40.

The first heater 76a and the second heater 76b are respectively connected to the connection terminals 43 via wiring lines and further connected to the head amplifier IC 30 via the flexure 28. By applying drive power to the first heater 76a and the second heater 76b from the heater power supply circuit of the head amplifier IC 30, the heaters and the surroundings of the heaters can be heated to cause the write head 58 or the read head 54 to expand toward the magnetic disk 12. The heater power supplied to the first heater 76a and the second heater 76b is controlled by the heater control section 46c of the main controller 40.

The heat resistance sensor HR is connected to the connection terminal 43 via wiring lines and further connected to the head amplifier IC 30 via the flexure 28. The detection signal (sensor output) of the heat resistance sensor HR is sent to the inspection circuit 46d of the main controller 40 via the head amplifier IC 30.

Figure 4:
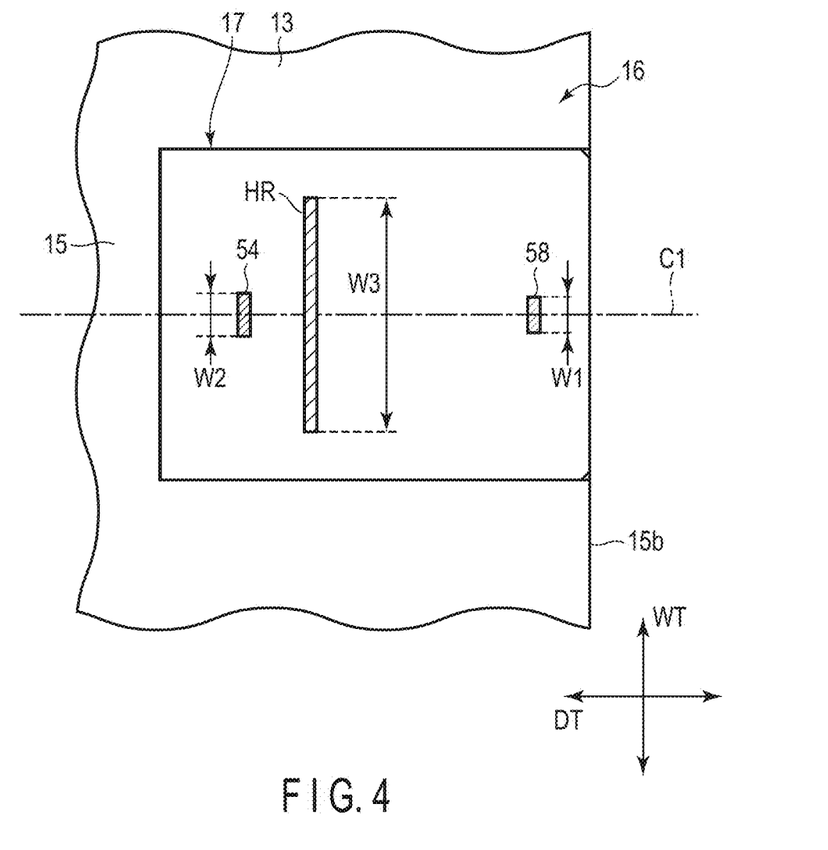
FIG. 4 is a plan view showing the head portion of the magnetic head as viewed from an ABS side.

FIG. 4 is a plan view showing the head portion 17 of the magnetic head 16 as viewed from the ABS side. As seen in the figure, the wright head 58, the heat resistance sensor HR, and the read head 54 are sequentially aligned along the central axis Cl of the magnetic head 16 in the longitudinal direction (track direction DT). The distal end portion of the wright head 58 (the tip of the main pole) exposed to the ABS 13 has a first width W1 in a direction orthogonal to the central axis Cl. The distal end portion of the reed head 54 exposed to the ABS 13 has a second width W2 in a direction orthogonal to the central axis Cl. The distal end portion (detection end) of the heat resistance sensor HR exposed to the ABS 13 has a third width W3 in a direction orthogonal to the central axis Cl. In one example, the third width W3 is greater than the first width W1 and greater than the second width W2.

The track width Wt of the recording tracks formed on the magnetic disk 12 (see FIG. 7) is approximately the same as the width W1 of the write head 58. In the strict sense, the track width Wt matches the width of the recording magnetic field generated by the write head 58. The width W3 of the heat resistance sensor HR is greater than the first width W1, and is set to, for example, a multiple of the width W1 by several times.

Figure 5:
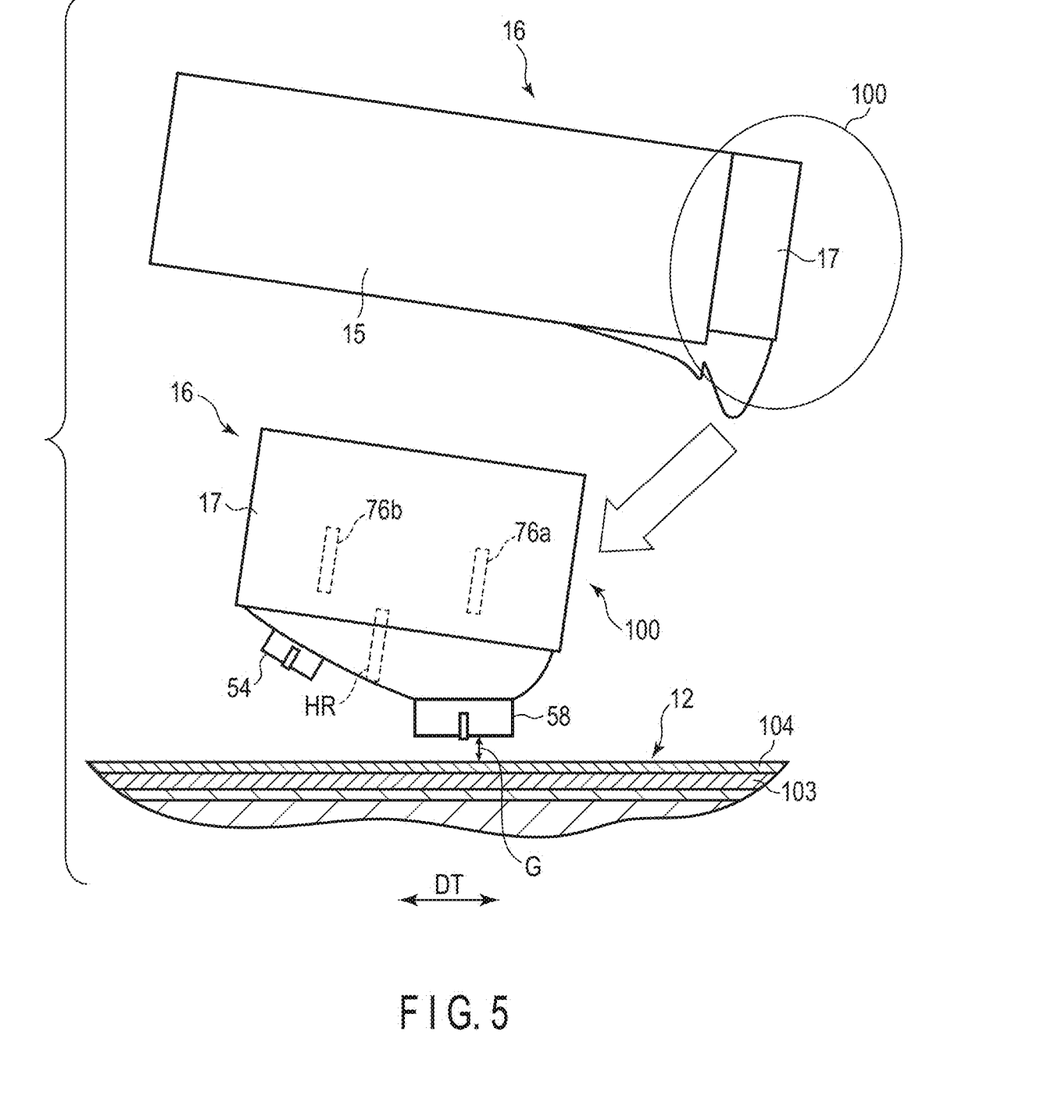
FIG. 5 is a side view schematically showing the magnetic head and the head portion in a state where a recording head portion is projected by a thermal actuator.

FIG. 5 is a side view schematically showing the magnetic head 16 and the head portion 17 in the state where the recording head portion is protruded by the thermal actuator. As shown in the figure, by applying drive power to the first heater 76*a*, for example, the first heater 76*a* and its surroundings are heated, and therefore the portion of the write head 58 is expanded toward the magnetic disk 12. With this configuration, it is possible to adjust the gap G between the write head 58 and the surface of the magnetic disk 12(, that is, the flying amount of the head).

Next, the operation of detecting minute protrusions (bumps) on the surface of the magnetic disk 12 and the operation of setting recording inhibited tracks or recording inhibited sectors in the HDD 10 configured as described above will be described. The HDD 10, for example, after manufacturing, before shipment, or at regular intervals, executes the detection of bumps and setting of recording inhibited tracks.

Figure 6:
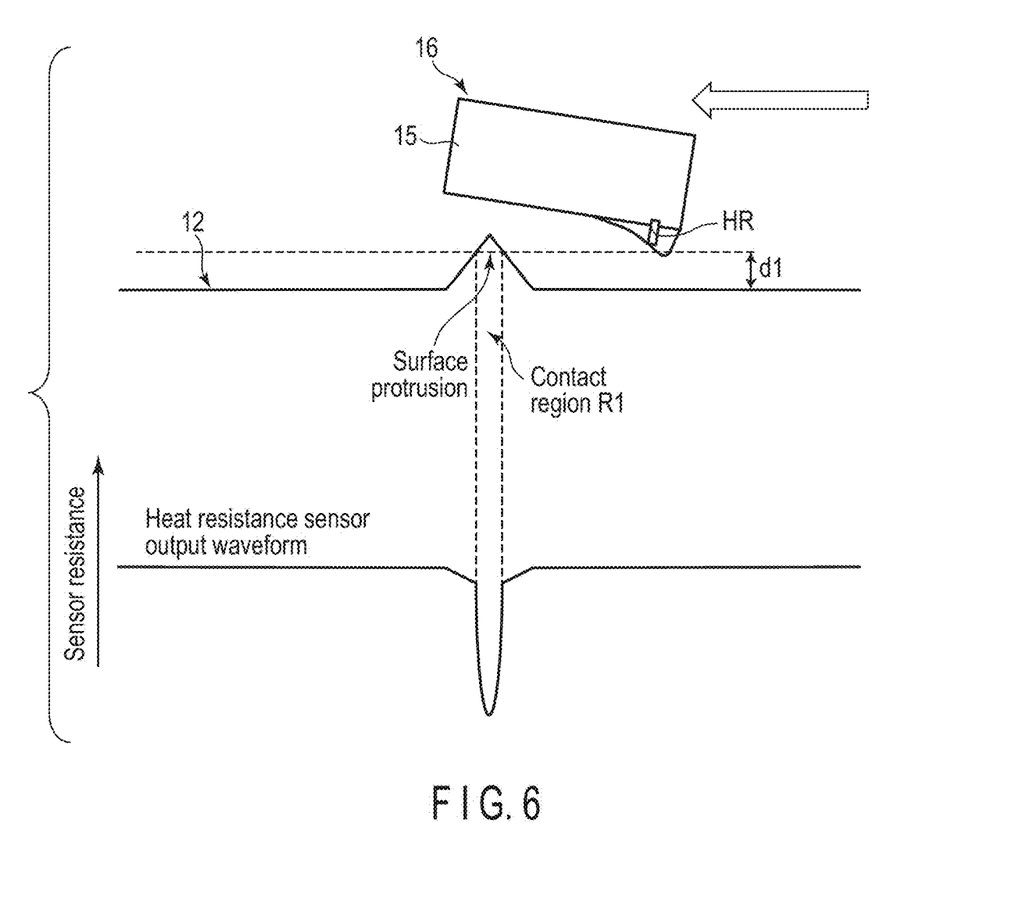
FIG. 6 is a diagram schematically showing an output of a heat resistance sensor when brought into contact with a projection on the recording medium.

FIG. 6 is a diagram schematically showing the output of the heat resistance sensor when brought into contact with a protrusion on a recording medium.

As shown in FIG. 6, in the case where a protrusion (bump) higher than the flying height d1 of the heat resistance sensor HR is created on the surface of the magnetic disk 12, when the heat resistance sensor HR passes over the protrusion, the sensor collides with the protrusion. As a result, the resistance of the heat resistance sensor HR changes, or more specifically, the resistance value decreases. Therefore, the output waveform of the heat resistance sensor HR becomes such a waveform that the portion corresponding to the contact region R1 is lowered. From the output waveform, the width of the region R1 brought into contact with the protrusion, that is, the width of the protrusion, can be obtained. Further, the height of the protrusion can be calculated out based on the amount of flying (G or d1) of the magnetic head 16 when the heat resistance sensor HR collides with the protrusion.

Note that as shown in FIG. 6, in this embodiment, the height of the protrusions (bumps) is defined as a height h taken along the direction perpendicular to the surface of the magnetic disk 12, and the width of the protrusions (bumps) is defined as the width W along the track direction.

In the operation of detection bumps, the controller 40 scans all tracks T1 to Tn of the magnetic disk 12 with the magnetic head 16 while sequentially changing the flying amount of the magnetic head 16. In one example, when the flying amount of the magnetic head 16 during normal recording is set to a specified value (for example, 1 nm), bumps are detected by scanning all tracks T1 to Tn in a state where the flying amount is set smaller than the specified value, for example, 0.7 nm. Next, the flying amount of the magnetic head 16 is set to 1 nm, and all tracks T1 to Tn are scanned to detect the bumps. Thereafter, the bumps are detected by scanning all the tracks T1 to Tn while increasing the flying amount of the magnetic head 16 in steps each by 0.3 nm. Then, when the flying amount reaches the point at which no output fluctuation of the heat resistance sensor HR occurs, that is, when the flying amount of the magnetic head has reached the point at which no bumps are detected, the detection operation on the surface of the magnetic head is finished.

As shown in FIG. 1, the sensor output of the heat resistance sensor HR is amplified by the head amplifier 30 and then sent to the inspection circuit 46*d* of the main controller 40. Based on the sensor output of the heat resistance sensor HR, the inspection circuit 46*d* calculates out the locations (track) of the bumps on the surface of the magnetic disk 12, the widths of the bumps, and the heights of the bumps. The main controller 40 stores and registers the calculated bump data in the memory 47. In one example, the memory 47 stores a data table indicating the locations, heights, and widths of bumps on each track.

Figure 7:
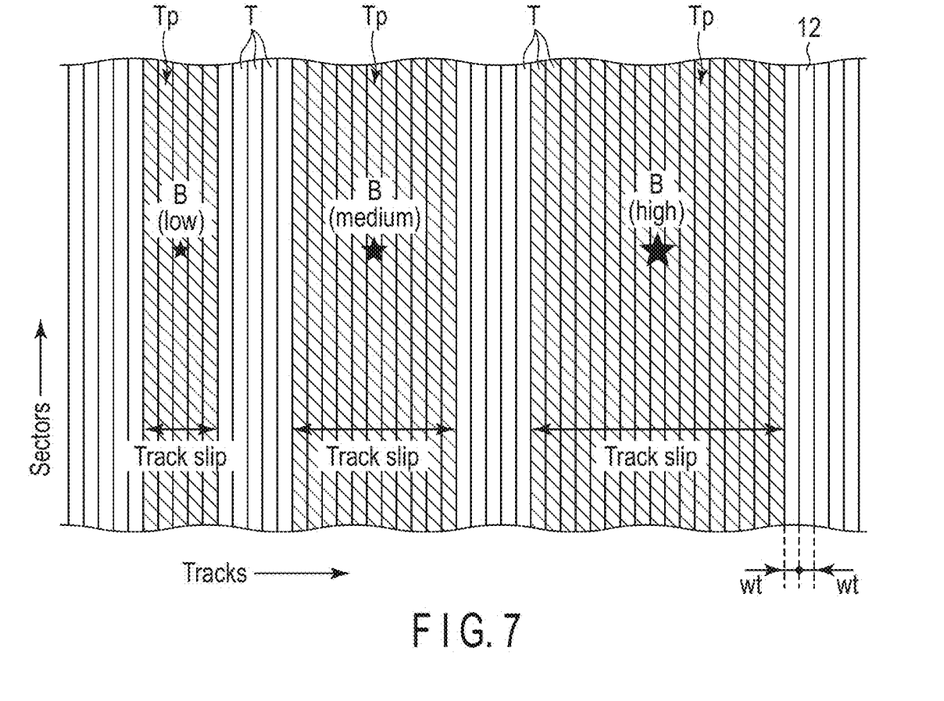
FIG. 7 is a diagram showing the relationship between the height of microscopic protrusions (bumps) on the recording media and the number of track slips.

FIG. 7 is a plan view schematically showing the relationship between the height (large or small) of a bump B located on a track of the magnetic disk 12 and the number of recording inhibited tracks (track slips).

The determination circuit 46*e* of the MPU 46 determines the height of the bump B for each of the tracks T1 to Tn based on the bump data registered in the memory 47, and sets the number of recording inhibit tracks Tp according to the height of the bump B, to be registered in the memory 47.

In one example, as shown in FIG. 7, the determination circuit 46*e* sets, for the bump B having a low height (low), for example, 0 to 1 nm, five tracks including the one that contains the bump B as recording inhibit tracks (track slips) Tp. With respect to the track where the bump B is located as a center, two tracks are set on each of the inner and outer circumferential sides, that is, a total of five recording inhibit tracks (track slips) Tp are set.

The determination circuit 46*e* sets, for the bump B having a medium height (medium), for example, 1 to 5 nm, eleven tracks including the one containing the bump B as recording inhibit tracks (track slips) Tp. With respect to the track where the bump B is located as a center, five tracks are set on each of the inner and outer circumferential sides, that is, a total of eleven recording inhibit tracks (track slips) Tp are set.

The determination circuit 46*e* sets, for the bump B having a high height (high), for example, 5 nm or more, seventeen tracks including the one containing the bump B as recording inhibit tracks (track slips) Tp. With respect to the track where the bump B is located as a center, five tracks on each of the inner and outer circumferential sides, that is, a total of eleven recording inhibited tracks Tp are set.

Note that the number of recording inhibit tracks is not limited to that of the example described above, but can be increased or decreased as necessary. The number of recording inhibit tracks can be determined according to the height of the bumps, and as the height of the bump is higher, the number of recording inhibit tracks are set more. Further, the height of the bump and the thresholds for low, medium, and high are not limited to those of the example described above, but can be changed as necessary.

When the HDD 10 is in operation, the main controller 40 executes the data recording operation for the other recording tracks T except for the recording inhibited tracks Tp registered in the memory 47. After the setting, the main controller 40 inhibits the recording operation on the recording inhibited tracks Tp, in other words, the magnetic head 16 is inhibited from accessing on the recording inhibited tracks Tp. After the setting of the recording inhibited tracks Tp, the magnetic head 16 is not brought into contact or does no collide with the bump B on the surface of the disk. With this configuration, it is possible to suppress damage to the magnetic head and the magnetic disk and improve the reliability.

According to the first embodiment configured as described above, the location, width, and height of a microscopic protrusion (bump) on the surface of the recording medium are detected, and the bump data including the detected bump height is stored and registered in the memory 47. In this manner, it is possible to apply the height data of the bump to various controls, thereby improving the recording density and reliability of the HDD.

According to the first embodiment, it is configured to set the number of recording inhibited tracks (track slips) according to the height of the bump. More specifically, as the height of the bump is greater, the number of recording inhibit tracks is set to be greater, whereas as the height of the bump is lower, the number of recording inhibit tracks is set to be less. As a result, according to this embodiment, the number of recording inhibit tracks can be reduced by about 60 to 75% as compared to the case where the common maximum number of recording inhibit tracks is set for all bumps. Thus, it is possible to suppress the reduction in the recording capacity of the disk device.

From the above, according to this embodiment, it is possible to provide a magnetic disk device which can suppress degradation in performance (reduction in recording capacity) caused by microscopic protrusions on the recording medium.

Next, HDDs according to other embodiments will be described. In the other embodiments provided below, parts identical to those of the first embodiment described above will be denoted by the same reference symbols, and the detailed description thereof will be omitted or simplified. The following description will focus on parts that differ from those of the first embodiment.

Second Embodiment

Figure 8:
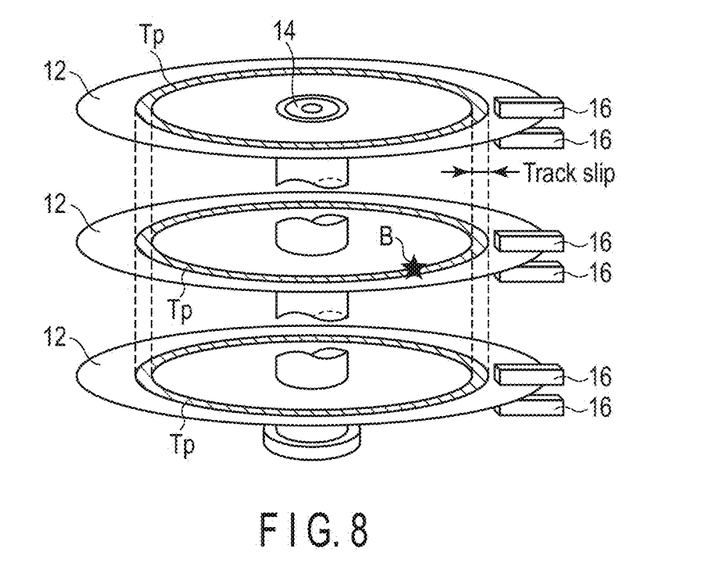
FIG. 8 is a diagram schematically showing magnetic disks and magnetic heads in an HDD according to the second embodiment.

FIG. 8 is a diagram schematically showing magnetic disks and magnetic heads in an HDD according to the second embodiment.

As in the case of the first embodiment, the main controller 40 of the HDD 10 detects minute protrusions (bumps) on the surface of a magnetic disk 12 and stores and registers bump data including the height, width, and location of the bumps in the memory 47. The main controller 40 determines the height of the bumps and sets the number of s Tp for each of the magnetic disks 12 according to the height of the bump B.

As shown in FIG. 8, for example, when the height of the bump B on the surface of the intermediate magnetic disk 12 is higher than an arbitrary specified value, in one example, 5 nm, the main controller 40 sets the number of recording inhibit tracks Tp corresponding to the height of bump B with respect to the intermediate magnetic disk 12. At the same time, for the surfaces of the other magnetic disks 12, the main controller 40 sets a plurality of tracks located at the same radial location as the above-described s Tp as s Tp and registers these in the memory 47. Thus, it is configured such as to inhibit to access to and perform recording operations on the s Tp located at the same radial location with respect to all the magnetic disks 12 and all the magnetic heads 16.

According to the second embodiment described above, the magnetic heads will no longer stay on the recording inhibited tracks Tp when performing write/read operations on magnetic disks other than those containing bumps of heights greater than the specified value, as well. Therefore, the contacting and collision of the magnetic head 16 with the bump B of a height greater than the above specified value can be prevented more reliably. When performing write/read operations on magnetic disks other than those containing high bumps, the collision between bumps and the magnetic head is suppressed and the vibration caused by the collision, which may degrade the write/read quality, can be prevented.

Note that in the second embodiment, the other configuration of the HDD is the same as that of the HDD of the first embodiment described above.

Third Embodiment

Figure 9:
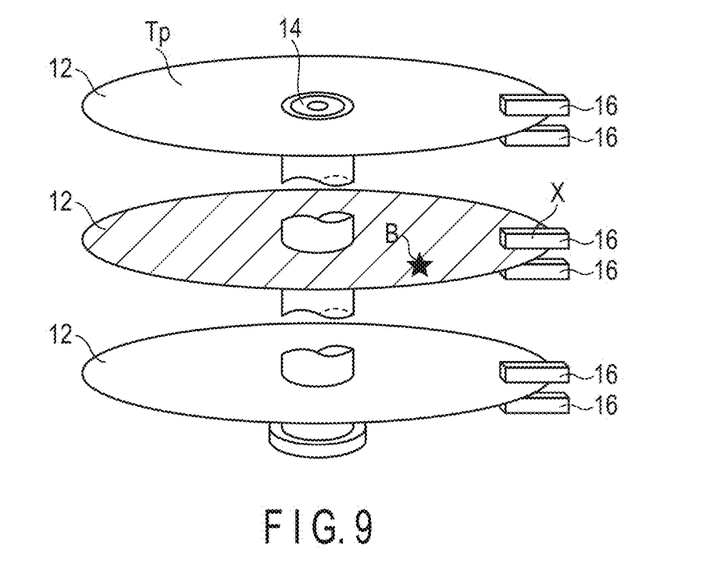
FIG. 9 is a diagram schematically showing magnetic disks and magnetic heads in an HDD according to the third embodiment.

FIG. 9 is a diagram schematically showing magnetic disks and magnetic heads in an HDD according to the third embodiment.

As in the case of the first embodiment, the main controller 40 of the HDD 10 detects minute protrusions (bumps) on the surface of the magnetic disk 12 and stores and registers bump data including the height, width and location of the bumps in the memory 47. The main controller 40 determines the height of the bumps and sets the number of s Tp for each of the magnetic disks 12 according to the height of the bumps B.

As shown in FIG. 9, for example, when the height of the bumps B existing on the surface of an intermediate magnetic disk 12 is higher than an arbitrary specified value, in one example, 5 nm, the main controller 40 carries out head-skipping of the magnetic head 16(X) corresponding to the surface of the magnetic disk where the bump B exists, that is, inhibits the use of the magnetic head 16(X).

In the third embodiment, the other configuration of the HDD is the same as that of the HDD of the first embodiment described above.

According to the third embodiment described above, the quality of the magnetic disk device can be guaranteed by not using magnetic heads that have a risk of degradation of recording quality due to collisions.

Fourth Embodiment

Figure 10:
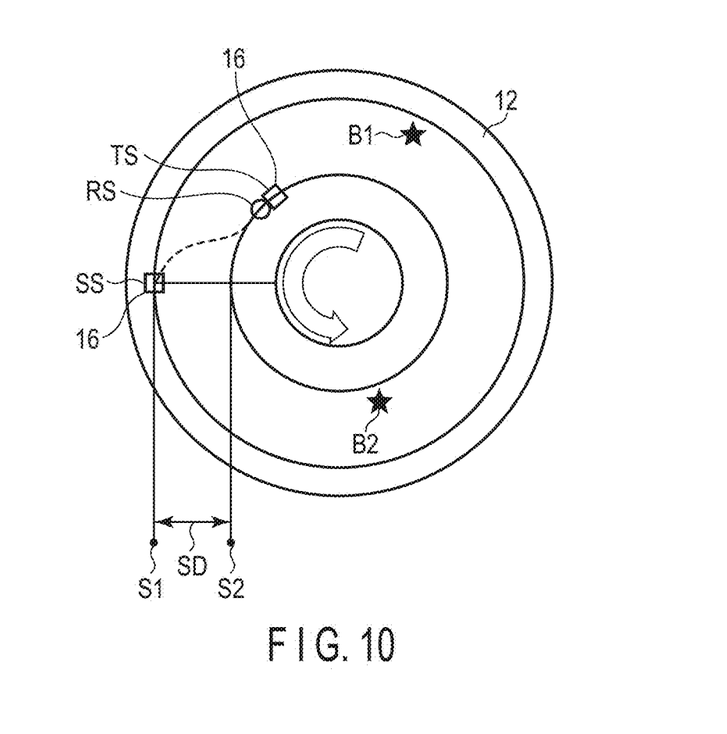
FIG. 10 is a plan view schematically showing magnetic disks and magnetic heads in an HDD according to the fourth embodiment.
Figure 11:
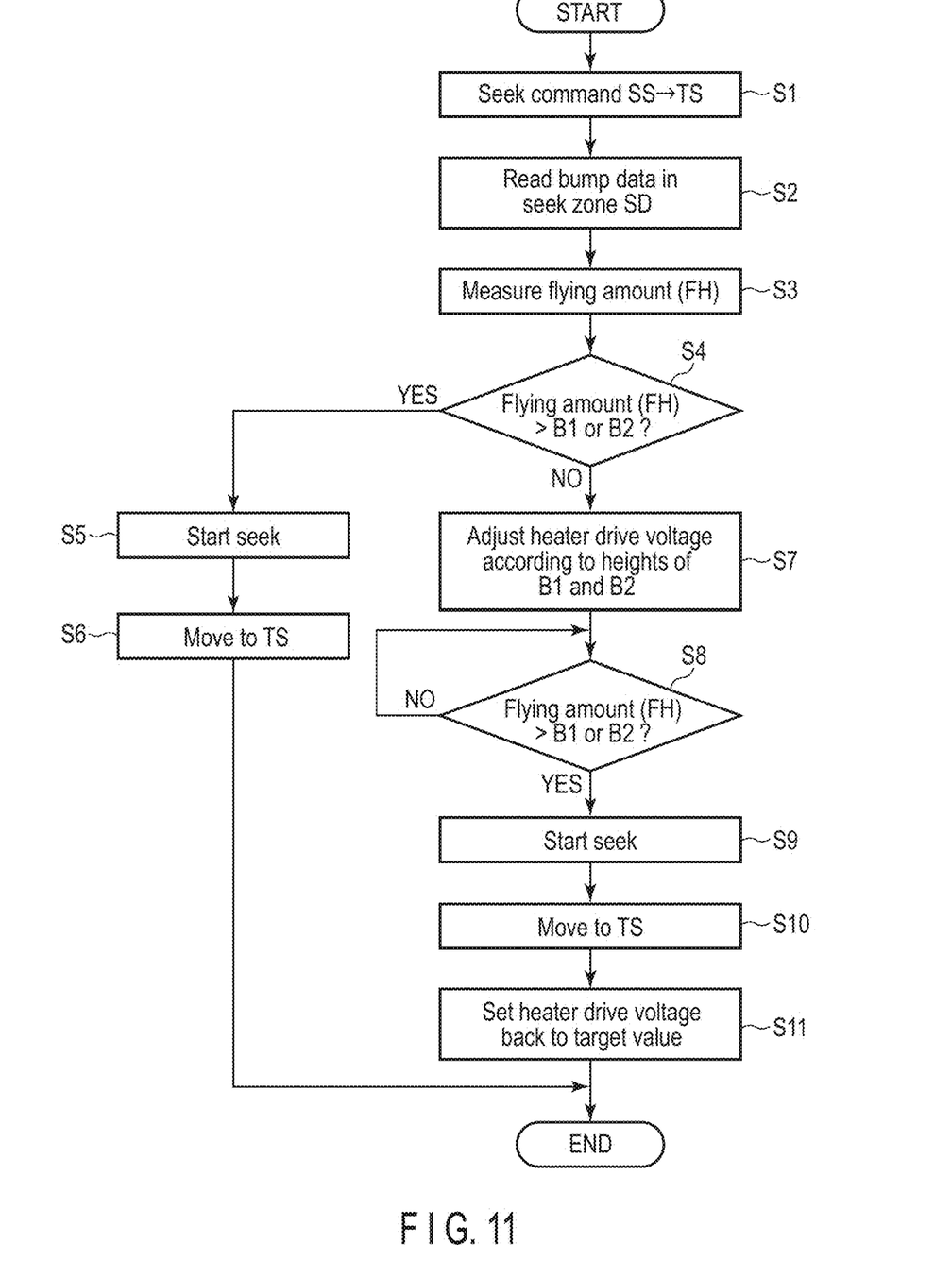
FIG. 11 is a flowchart illustrating a seek operation in the HDD according to the fourth embodiment.

FIG. 10 is a plan view schematically showing magnetic disks and magnetic heads in an HDD according to the fourth embodiment. FIG. 11 is a flowchart showing operations during head seek in the HDD of the fourth embodiment.

As in the case of the first embodiment, the main controller 40 of the HDD 10 detects minute protrusions (bumps) on the surface of the magnetic disk 12 and stores and registers bump data including the height, width and location of the bumps in the memory 47. The main controller 40 determines the height of the bumps and sets the number of recording inhibited tracks Tp for each of the magnetic disks 12 according to the height of the bumps B.

According to the fourth embodiment, the HDD 10 is configured to control the seek operation of the magnetic head 16 according to the height of the bumps B. As shown in FIGS. 10 and 11, when seeking the magnetic head 16 from a seek start sector SS to a target sector TS, the MPU 46 of the main controller 40 receives TS from a seek command SS (ST1), and then reads bumps B1 and B2 existing in the seek zone SD (S1 to S2) and bump data (heights of B1 and B2) from the memory 47 (ST2), which are input to the determination circuit 46e. The determination circuit 46e measures in advance the flying height (FH) of the magnetic head 16 in the seek start sector SS (ST3). Then, the determination circuit 46e compares the measured flying height FH with the input heights of the bumps B1 and B2 (ST4) and determines whether there are bumps that may affect the control of the flying height FH.

When the heights of all the bumps B1 and B2 existing in the seek zone SD are lower than the flying amount FH of the magnetic head 16, the determination circuit 46e determines that there are no bumps that may affect the control of the flying amount FH. In this case, the MPU 46 starts the seek operation of the respective magnetic head 16 without changing the drive voltage of the heaters 76a and 76b, that is, without changing the flying amount FH of the magnetic head 16 (ST5). The MPU 46 ends the seek operation when the magnetic head 16 reaches the target sector TS via an R/W preparation sector RS (ST6). Note that the R/W preparation sector RS is a sector located on the same track as the target sector TS and adjacent thereto on the upstream side of the target sector TS.

On the other hand, in the processing step ST4, when there is a bump with a height higher than the flying amount FH of the magnetic head 16, the determination circuit 46e determines that there is a bump that may affect the control of the flying amount FH. In this case, the MPU 46 adjusts the heater drive voltage according to the difference between the flying amount FH and the heights of the bumps B1 and B2 (ST7). That is, the MPU 46 reduces the heater drive voltage so as to cause the flying amount FH of the magnetic head 16 to be higher than the bump height. The amount of adjustment of the heater drive voltage is not uniform, but set to be variable according to the bump height.

The determination circuit 46e compares the changed flying amount FH with the heights of the bumps B1 and B2 (ST8), and determines that the seek can be started when the flying amount FH becomes sufficiently high. The MPU 46 starts the seek operation of the magnetic head 16 according to the determination result of the determination circuit 46e (ST9). The MPU 46 terminates the seek operation when the magnetic head 16 reaches the target sector TS via the R/W preparation sector RS (ST10). Further, the MPU 46 raises the heater drive voltage to the target value when the magnetic head 16 has completely passed through the bumps B1 and B2, and then starts lowering the flying amount FH of the magnetic head 16 to the target value (ST11).

Note that in the fourth embodiment, the other configuration of the HDD is the same as that of the HDD of the first embodiment described above.

According to the fourth embodiment with the configuration described above, by controlling the seek operation according to the height of the bumps existing in the seek zone of the magnetic head, the time required for the seek operation can be reduced and the read/write performance can be improved. According to this embodiment, the heights of bumps existing in the seek zone are compared with the current flying height of the magnetic head and when it is determined that all bumps are lower than the flying height, the seek operation can be executed without changing the heater power supply voltage, that is, without adjusting the flying height of the magnetic head. With this configuration, the waiting time for cooling when adjusting the flying amount is no longer required, thereby speeding up the seeking process.

Further, when it is determined that there is a bump higher than the magnetic head flying amount, the heater power supply voltage and the cooling wait time are adjusted according to the difference between the flying amount and bump height, and thus it becomes possible to set each of the voltage adjustment amount and the waiting time for cooling to the minimum necessary level. Therefore, the seek processing time can be shortened in this case as well.

As described above, according to this embodiment, it is possible to provide a magnetic disk device which can suppress the degradation in performance, which may be caused by microscopic protrusions on the recording media.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of s set according to the bump height is not limited to those of the embodiments described above, but can be increased or decreased as necessary. The above-described embodiments are also applicable to HDDs with the shingled magnetic recording mode.

The material, shape, size, etc., of the elements that constitute the head portion of the magnetic head can be changed as necessary. In the magnetic disk device, the number of magnetic disks and the number of magnetic heads can be increased or decreased as necessary. The size of the magnetic disks can be selected from various types.

What is claimed is:

1. A magnetic disk device comprising:
a rotatable disk-shaped recording medium including a plurality of concentric recording tracks;
a magnetic head comprising a write element which writes data to the recording tracks, a heating element, and a sensor which detects a surface condition of the recording medium; and
a controller comprising an inspection circuit which detects, based on an sensor output of the sensor, presence or absence of a bump on a surface of the recording medium, a height and a width of the bump, and a memory which records the detected height and width of the bump, wherein
the controller sets a track on which the bump exists and several tracks located on both sides of the track in a radial direction as recording inhibit tracks and registers these in the memory, and
the recording inhibit tracks vary in number according to the height of the bump.

2. The magnetic disk device of claim 1, wherein
the controller includes a determination circuit which determines the height of the bump registered in the memory, and
the controller increases the number of recording inhibit tracks to be set around the bump as the height of the bump determined by the determination circuit is higher.

3. A magnetic disk device comprising:
a plurality of rotatable disk-shaped recording media, each rotatable disk-shaped recording medium including a plurality of concentric recording tracks;
a magnetic head comprising a write element which writes data to the recording tracks, a heating element, and a sensor which detects a surface condition of the recording medium; and
a controller comprising an inspection circuit which detects, based on a sensor output of the sensor, presence or absence of a bump on a surface of the recording medium, a height and a width of the bump, and a memory which records the detected height and width of the bump,
wherein the controller includes a determination circuit which determines the height of the bump registered in the memory, and
the controller sets, when a bump is determined to be higher than a specified value by the determination circuit, a plurality of recording inhibit tracks around the bump and sets a plurality of tracks at a same radius location as that of the plurality of recording inhibit tracks in all other recording media as recording inhibit tracks.

4. A magnetic disk device comprising:
a rotatable disk-shaped recording medium including a plurality of concentric recording tracks;
a magnetic head comprising a write element which writes data to the recording tracks, a heating element, and a sensor which detects a surface condition of the recording medium; and
a controller comprising an inspection circuit which detects, based on a sensor output of the sensor, presence or absence of a bump on a surface of the recording medium, a height and a width of the bump, and a memory which records the detected height and width of the bump, wherein
the controller includes a determination circuit which determines the height of the bump registered in the memory, and
the controller inhibits, when a bump is determined to be higher than a specified value by the determination circuit, use of the magnetic head corresponding to the recording medium in which the bump exists.

5. A magnetic disk device comprising:
a rotatable disk-shaped recording medium including a plurality of concentric recording tracks;
a magnetic head comprising a write element which writes data to the recording tracks, a heating element, and a sensor which detects a surface condition of the recording medium; and
a controller comprising an inspection circuit which detects, based on a sensor output of the sensor, presence or absence of a bump on a surface of the recording medium, a height and a width of the bump, and a memory which records the detected height and width of the bump, wherein
the controller includes a determination circuit which determines the height of the bump registered in the memory and a heating element control unit which controls a power supply voltage supplied to the heating element,
the determination circuit determines presence or absence of a bump which affect control of an amount of flying of the magnetic head in a seek zone, and
the controller executes, when the determination circuit determines that there is no bump which affects the control of the flying amount of the magnetic head, the seek of the magnetic head without changing a drive voltage on the heating element.

6. The magnetic disk device of claim 5, wherein the determination circuit determines whether the bump affects the control of the flying amount of the magnetic head by comparing the flying amount of the magnetic head at a seek start position and the height of the bump recorded in the memory with each other.

7. The magnetic disk device of claim 5, wherein the controller changes, when the determination circuit determines that there is a bump which affects the control of the flying amount, a power supply voltage on the heating element and increases the flying amount of the magnetic head according to the height of the bump which affects the control of the flying amount.

8. The magnetic disk device of claim 7, wherein the controller changes the power supply voltage on the heating element and a waiting time for cooling according to a difference between the flying amount of the magnetic head at a seek start position and the height of the bump recorded in the memory.

* * * * *